United States Patent [19]
Morrow et al.

[11] Patent Number: 5,881,060
[45] Date of Patent: Mar. 9, 1999

[54] INTEGRATED CELLULAR VOICE AND DIGITAL PACKET DATA TELECOMMUNICATIONS SYSTEMS AND METHODS FOR THEIR OPERATION

[75] Inventors: Glenn Charles Morrow; Emad Abdel-Lateef Qaddoura; Charles James Derrick; Kenneth W. Pecot, all of Plano; Nivedan Thadasina, Carrollton; Nikhil Jain; Patricia Ann Landgren, both of Plano; Bradley A. Fink, Allen, all of Tex.

[73] Assignee: Northern Telecom Limited, Montreal, Canada

[21] Appl. No.: 655,387

[22] Filed: May 30, 1996

[51] Int. Cl.$^6$ .............................. H04B 7/212; H04J 3/00; H04Q 7/24; H04Q 7/20
[52] U.S. Cl. ..................... 370/337; 370/352; 370/389; 370/493; 455/450; 379/93.28
[58] Field of Search .................................. 370/280, 341, 370/493, 352, 337, 330, 389, 353, 354, 355, 356, 442; 379/93.28; 455/466, 450, 452; 340/825.03

[56] References Cited

U.S. PATENT DOCUMENTS

| | | |
|---|---|---|
| 4,831,373 | 5/1989 | Hess ................................... 340/825.03 |
| 5,533,019 | 7/1996 | Jayapalan ................................. 370/352 |
| 5,701,297 | 12/1997 | Csapo et al. ............................ 370/341 |

*Primary Examiner*—Jason Chan
*Assistant Examiner*—Melissa Kay Carman
*Attorney, Agent, or Firm*—Foley & Lardner

[57] ABSTRACT

An integrated voice and packet data telecommunications system has at least one dual mode channel. The system comprises a plurality of transceivers, at least one transceiver being operable to transmit and receive voice traffic on the dual mode channel, and at least one transceiver being operable to transmit and receive packet data traffic on the dual mode channel. The system further comprises a controller for controlling the transceivers so as to allocate the dual mode channel either to voice communications or to packet data communications. The controller responds to changing demand for voice channels and packet data channels by changing dynamically the allocation of the dual mode channel. The system is particularly useful for providing Cellular Digital Packet Data (CDPD) services.

18 Claims, 7 Drawing Sheets

| Channel Group | Channels |
|---|---|
| Va | 106,127 |
| Vb | 212,233 |
| Vc | 213,234 |
| Vd | 4,25 |
| Ve | 215,236 |
| Vf | 111,132 |
| Vg | 112,133 |
| DMa | 148,169 |
| DMb | 254,275 |
| DMc | 255,276 |
| DMd | 46,67 |
| DMe | 257,278 |
| DMf | 153,174 |
| DMg | 154,175 |
| PDa | 190 |
| PDb | 296 |
| PDc | 297 |
| PDd | 88 |
| PDe | 299 |
| PDf | 195 |
| PDg | 196 |

Fig. 6

INTEGRATED CELLULAR VOICE AND DIGITAL PACKET DATA TELECOMMUNICATIONS SYSTEMS AND METHODS FOR THEIR OPERATION

FIELD OF INVENTION

This invention relates to cellular voice and Cellular Digital Packet Data (CDPD) telecommunications systems, and to methods for their operation.

BACKGROUND OF INVENTION

In conventional cellular telephone networks, a base station is provided for each cell of the area served by the cellular network. Each base station comprises a plurality of radio transceivers which provide radio channels for voice communications between the base stations and mobile telephones in the cells served by the base stations. The base stations are connected to mobile switching centers which provide telecommunications switching between base stations. A gateway mobile switching center is connected between the mobile switching centers and a Public Switched Telephone Network (PSTN) so that mobile telephones served by the cellular telephone networks can be connected to telephones served by the PSTN.

In addition to voice telephony services provided to mobile telephone users by cellular telephone networks, there is a demand for packet data services provided to mobile data terminals. In April 1992 an industry consortium was formed to develop standards for providing Cellular Digital Packet Data (CDPD) services. In July 1993 this consortium released version 1.0 of a CDPD Specification which defines standard interfaces and functionality for CDPD networks. Version 1.0 of the CDPD Specification is hereby incorporated by reference.

A CDPD network may be implemented as an overlay on an existing cellular telephone network. The CDPD Specification calls for Mobile Data Base Stations (MDBSs) to serve mobile data terminals called Mobile End Stations (MESs). The MDBSs are connected to Mobile Data Intermediate Systems (MDISs) which are connected to external public or private Packet Data Networks (PDNs) so that the MESs can exchange packet data with Fixed End Stations (FESs) connected to the PDNs.

The MDBSs use the same radio frequency channels to exchange packet data with the MESs as do voice base stations serving mobile telephones in the same serving area. To avoid radio interference bet-ween packet data transmissions and voice transmissions, the MDBSs must use radio frequency scanners to scan the voice channels to determine which voice channels are currently in use by the voice base stations serving the same area, and tune their transceivers to only those channels which are not currently in use for voice communications. Consequently, the MDBSs "hop" among the voice channels to avoid voice calls which are currently in progress.

The frequency scanning and retuning operations of the MDBSs require considerable processing. Moreover, each frequency hop executed in order to "dodge" a voice call interrupts packet data transmission, reducing the data throughput of the CDPD network. Furthermore, because expensive MDBS hardware, MDIS hardware and transmission facilities linking the MDBS hardware to the MDIS hardware are needed to provide CDPD service, the cost of introducing CDPD service is higher than desired, particularly where the initial demand for CDPD service is limited. If the CDPD service providers price the service high enough to pay back their equipment investment quickly or limit deployment of CDPD service to high traffic areas, they risk limiting CDPD market growth.

Moreover, the boundaries of cells served by MDBSs do not coincide exactly with the boundaries of cells served by voice base stations even when the MDBSs and the voice base stations are co-located. The cell boundaries do not coincide exactly because the intercell hand off criteria are different for voice and packet data transmission. The mismatch of cell boundaries can lead to excessive interference between channels used for voice communications and channels used for packet data communications.

SUMMARY OF INVENTION

An object of this invention is to reduce or avoid some or all of the disadvantages of CDPD networks as outlined above by integrating CDPD equipment with equipment providing voice services.

One aspect of this invention provides an integrated voice and packet data telecommunications system having at least one dual mode channel. The system comprises a plurality of transceivers. At least one of the transceivers is operable to transmit and receive voice traffic on the dual mode channel, and at least one of the transceivers is operable to transmit and receive packet data traffic on the dual mode channel. The system further comprises a controller for controlling the plurality of transceivers so as to allocate the dual mode channel to one of voice communications and packet data communications. The controller is operable, in response to changing demand for voice channels and packet data channels, to change dynamically the allocation of the dual mode channel.

The use of a common controller for voice and packet data services avoids the need to scan the voice channels to determine which voice channels are currently in use because that information is already available in the controller. This avoids the cost of radio frequency scanners and the processing resources needed to drive the radio frequency scanner. In addition, the common controller can be designed so as to assign channels to voice and packet data traffic in a more orderly manner to reduce the number of channel hops needed for packet data traffic, as will be explained in greater detail below. This increases the packet data throughput without increasing voice call blocking.

In one embodiment suited to applications in which voice traffic is accorded priority over packet data traffic, the controller is responsive to a demand for a voice channel to allocate the dual mode channel to voice communications, and is responsive to no demand for a voice channel to allocate the dual mode channel to packet data communications.

In most practical implementations, the system will have a plurality of dual mode channels, and the plurality of transceivers will be operable to transmit and receive voice traffic on any of the dual mode channels. The plurality of transceivers will also be operable to transmit and receive packet data traffic on any of the dual mode channels. The controller will respond to demands for voice channels by selecting dual mode channels for allocation to voice communications, and will allocate to packet data communications any dual mode channel not selected for allocation to voice communications.

The controller may be operable to maintain a dual mode queue of dual mode channels not allocated to voice communications, and, in response to a demand for a voice channel, to select a dual mode channel according to its position in the dual mode queue. The controller may further be operable, in response to release of the dual mode channel allocated to voice communications, to return the dual mode channel to the dual mode queue and to reallocate the dual mode channel to packet data communications. The controller may operate the dual mode queue as a Last In, First Out (LIFO) queue so as to provide as many interruption-free packet data channels as the voice traffic conditions will permit.

The system may further comprise a plurality of voice channels in addition to the plurality of dual mode channels, the voice channels being dedicated to voice communications. In this case, the controller may also be operable to maintain a voice queue of idle voice channels. The controller may be operable, in response to a request for a voice channel when at least one voice channel is present in the voice queue, to select a channel from the voice queue, and may be operable, in response to a request for a voice channel when no voice channel is present in the voice queue, to demand a channel from the dual mode queue. In this manner, the controller only allocates dual mode channels to voice calls when no voice channels are available, thereby minimizing interruptions to packet data transmission for maximum packet data throughput.

Alternatively, because the number of interruptions to packet data transmission is reduced, the duration of the switching operations performed at each interruption has a smaller impact on the data throughput. Consequently, the design constraints on this switching duration may be relaxed, reducing the cost of the hardware and software implementation.

To further improve packet data throughput, the controller may be operable, in response to release of a voice channel when at least one dual mode channel is allocated voice communications, to select a dual mode transceiver, to hand off a voice call served by the selected dual mode channel to the released voice channel, to return the selected dual mode channel to the dual mode queue, and to reallocate the selected dual mode channel to packet data communications. The hand off can be triggered only when the dual mode queue is empty to minimize voice call hand offs. Alternatively, the hand off can be triggered if any dual mode channels are allocated to voice communications to maximize packet data throughput. The controller can be made operator configurable with respect to these hand off options.

The integrated voice and packet data telecommunications system may be a cellular system having a plurality of cells, a respective subset of the plurality of voice channels being assigned to each cell and a respective subset of the plurality of dual mode channels being assigned to each cell. In particular, the frequency plan for the dual mode channels may be distinct from the frequency plan for the voice channels.

The use of distinct frequency plans for the dual mode and voice channels reduces the interference between voice transmissions and packet data transmissions that can result from the different intercell hand off algorithms used for voice and packet data communications.

The system may also comprise one or more packet data channels which are dedicated to packet data operation to ensure a minimum level of packet data throughput regardless of the voice traffic. In this case the above hand off options may be disabled as long as one or more of the packet data channels is in operation.

One or more of the plurality of transceivers may be a dual mode transceiver which is operable in a voice mode to transmit and receive voice traffic, and operable in a packet data mode to transmit and receive packet data traffic. In this case, the controller may be operable to switch the dual mode transceiver between the voice mode of operation and the packet data mode of operation.

Thus, another aspect of the invention provides an integrated voice and packet data telecommunications system comprising at least one dual mode radio transceiver and a controller. The dual mode radio transceiver is operable in a voice mode to transmit and receive voice traffic and operable in a packet data mode to transmit and receive packet data traffic. The controller is operable to switch the dual mode transceiver between the voice mode of operation and the packet data mode of operation.

Each dual mode transceiver may be implemented as a processor combined with at least one radio transmitter and at least one radio receiver. The processor may be operable in a voice mode for voice communications and in a packet data mode for packet date communications.

Thus, another aspect of the invention provides a dual mode radio transceiver comprising at least one radio transmitter, at least one radio receiver and a processor for processing signals to be transmitted by the radio transmitter and for processing signals received by the radio receiver. The processor is configurable in a voice mode for processing voice traffic, and is configurable in a packet data mode for processing packet data traffic.

Because the dual mode transceivers and the controller are shared between voice and packet data services, packet data services can added to voice services for the relatively low incremental cost of the software required to provide the packet data services. Moreover, packet data services can be added to existing voice services without coupling additional radio frequency equipment to existing cell site antennas, and without interruptions to existing voice services to install such equipment. Furthermore, because the transceivers required for voice and packet data services are located at a common base station site, voice signals and packet data signals can be multiplexed together for transmission to and from the base station site on a shared multiplexed transmission link to minimize transmission facility costs.

Another aspect of this invention provides a method of operating an integrated voice and packet data telecommunications system, the system having a plurality of dual mode channels, each operable in a voice mode for voice communications and operable in a packet data mode for packet data communications. The method comprises maintaining a dual mode queue of dual mode channels allocated to packet data communications, selecting, in response to a demand for a voice channel, a dual mode channel according to its position in the dual mode queue, and allocating the selected channel to voice communications.

BRIEF DESCRIPTION OF DRAWINGS

Embodiments of the invention are described below by way of example only. Reference is made to accompanying drawings in which.

DETAILED DESCRIPTION

Figure 1:
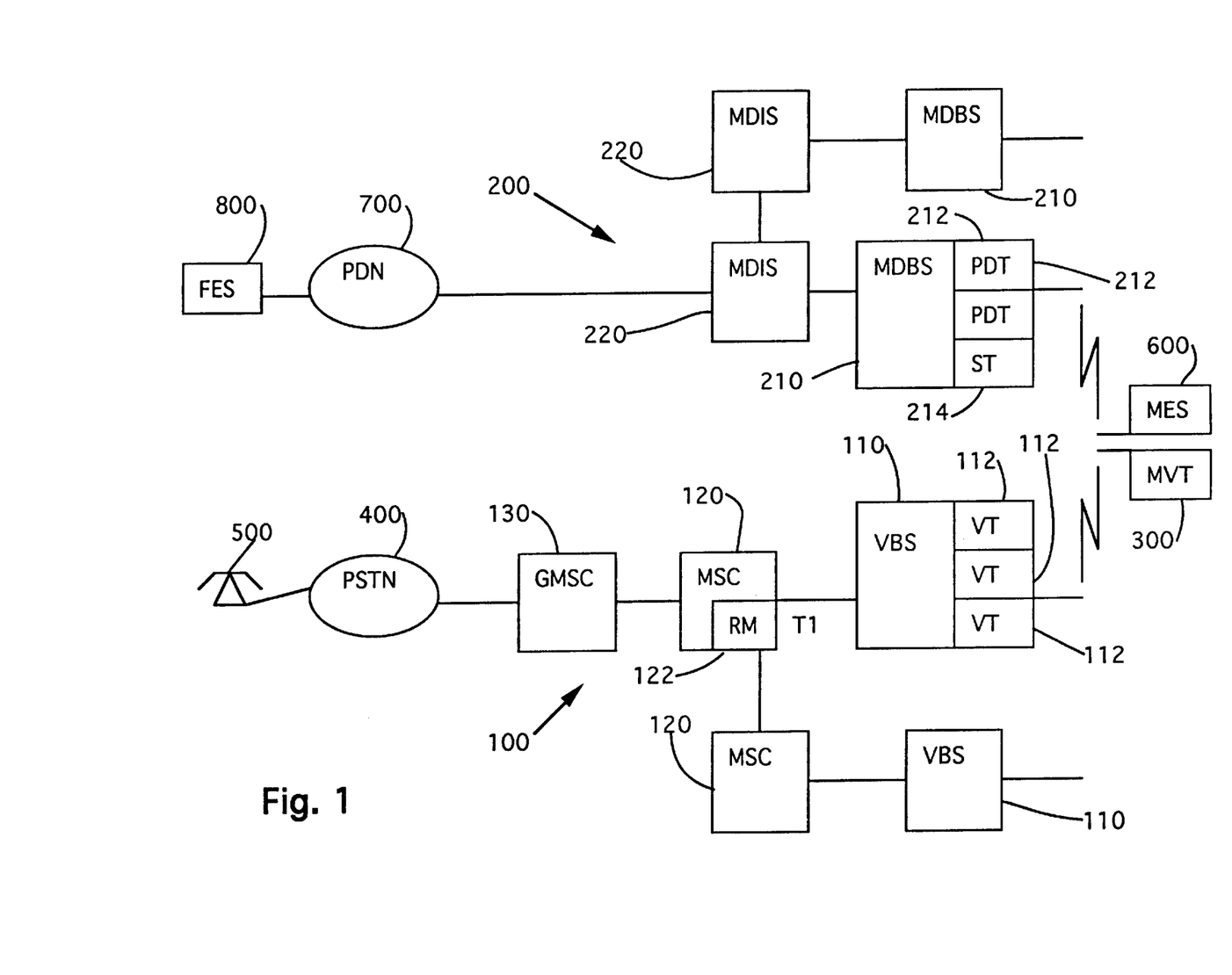
FIG. 1 is a block schematic view of a CDPD system overlaid on a cellular voice telephony system according to the CDPD Specification.

FIG. 1 is a block schematic view of a CDPD system 200 overlaid on a cellular voice telephony system 100 according to the CDPD Specification.

The cellular voice telephony system 100 comprises a plurality of voice base stations (VBSs) 110 interconnected by a plurality of mobile switching centers (MSCs) 120. Each VBS 110 comprises a plurality of voice radio transceivers (VTs) 112 which provide radio frequency channels for voice communications between the VBSs 110 and mobile voice terminals (for example, MVT 300) in cells served by the VBSs 110.

The VBSs 110 are connected to the MSCs 120 via multiplexed transmission links, for example T1, E1 or other standard or proprietary format multiplexed transmission links. The MSCs 120 provide telecommunications switching between the VBSs 110. The MSCs 120 comprise a resource manager (RM) 122 which controls the allocation of radio channels to voice calls.

A gateway MSC (GMSC) 130 is connected between the MSCs 120 and a Public Switched Telephone Network (PSTN) 400 so that MVTs 300 served by the cellular voice telephony system 100 can be connected to telephones 500 served by the PSTN 400.

The CDPD system 200 comprises a plurality of mobile data base stations (MDBSs) 210 interconnected by a plurality of mobile data intermediate systems (MDISs) 220. Each MDBS 210 comprises a plurality of packet data radio transceivers (PDT) 212 which provide packet data radio channels for packet data communications between the MDBSs 210 and mobile end systems (MESs) 600 in cells served by the MDBSs 210. The MDBSs 210 further comprise a scanning transceiver (ST) 214 which scans the radio frequency channels used by the VBSs 110 to determine which voice channels are currently in use. The PDTs 212 are tuned to radio frequency channels which are not currently in use by the VBSs 110 to provide packet data communications between the MDBSs 210 and the MESs 600. Consequently, the MDBSs 210 "hop" among the radio frequency channels to avoid voice calls which are currently in progress. (See part 405 of the CDPD System Specification, Release 1.1 issued by the CDPD-Forum on Jan. 19, 1995.)

The MDISs 220 are connected to public or private packet data networks (for example PDN 700) so that MESs 600 served by the CDPD system 200 can be connected to fixed end stations (for example FES 800) which are served by the PDNs 700.

The frequency scanning and retuning operations of the MDBSs 210 combined with overhead data transfer operations needed to effect movement of packet data traffic from one channel to another channel amount to a considerable processing load on the MDBSs 210. Moreover, each frequency hop executed in order to "dodge" a voice call interrupts packet data transmission, reducing the data throughput of the CDPD system 200. Furthermore, because expensive MDBS hardware (including the ST 214), MDIS hardware and transmission facilities linking the MDBS hardware to the MDIS hardware are needed to provide CDPD service; the cost of introducing CDPD service is higher than desired, particularly where the initial demand for CDPD service is limited. The boundaries of cells served by the MDBSs 210 do not coincide exactly with the boundaries of cells served by VBSs 110 even when the MDBSs and the voice base stations are co-located because the intercell hand off criteria are different for voice and packet data transmission. The mismatch of cell boundaries can lead to excessive interference between channels used for voice communications and channels used for packet data communications.

Figure 2:
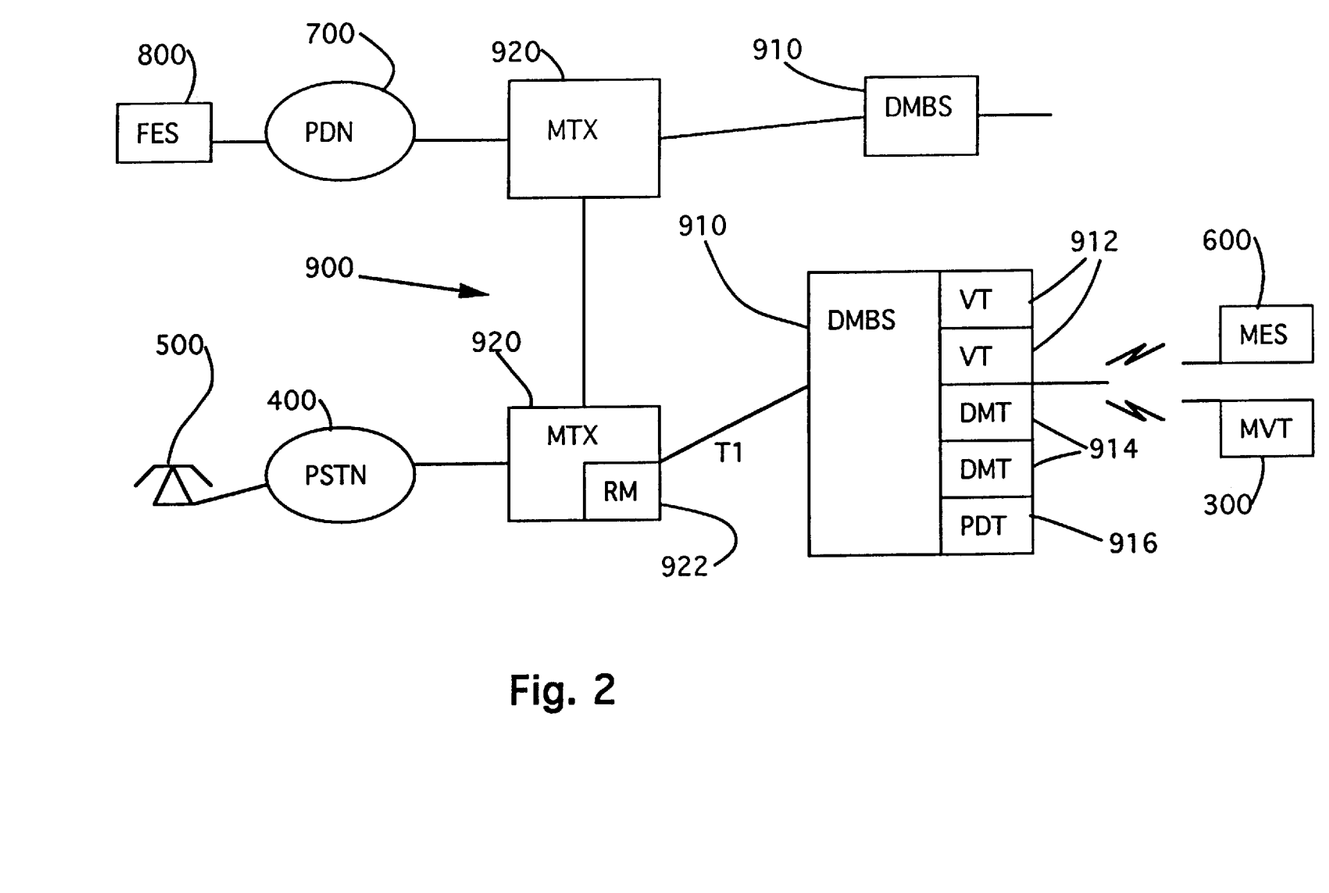
FIG. 2 is a block schematic diagram of an integrated CDPD and cellular voice telephony system according to an embodiment of the invention.

FIG. 2 is a block schematic diagram of an integrated CDPD and cellular voice telephony system 900 according to an embodiment of the invention. The integrated system 900 comprises a plurality of dual mode base stations (DBMSs) 910 interconnected by a plurality of Nortel MTX™ mobile switching centers (MTXs) 920. Each DMBS 910 comprises a plurality of voice radio transceivers (VTs) 912 which provide voice radio channels for voice communications between the DMBSs 910 and mobile voice terminals (for example, MVT 300) in cells served by the DMBSs 910.

The DMBSs 910 are connected to the MTXs 920 via multiplexed transmission links, for example T1, E1 or other standard or proprietary format multiplexed transmission links. The MTXs 920 provide telecommunications switching between the DMBSs 910. The MTXs 920 comprise a resource manager (RM) 922 which controls the allocation of radio channels to voice calls.

The MTXs 920 also perform the function of a gateway MSC, connecting the integrated system 900 to the Public Switched Telephone Network (PSTN) 400 so that MVTs 300 served by the integrated system 900 can be connected to telephones 500 served by the PSTN 400.

Figure 3:
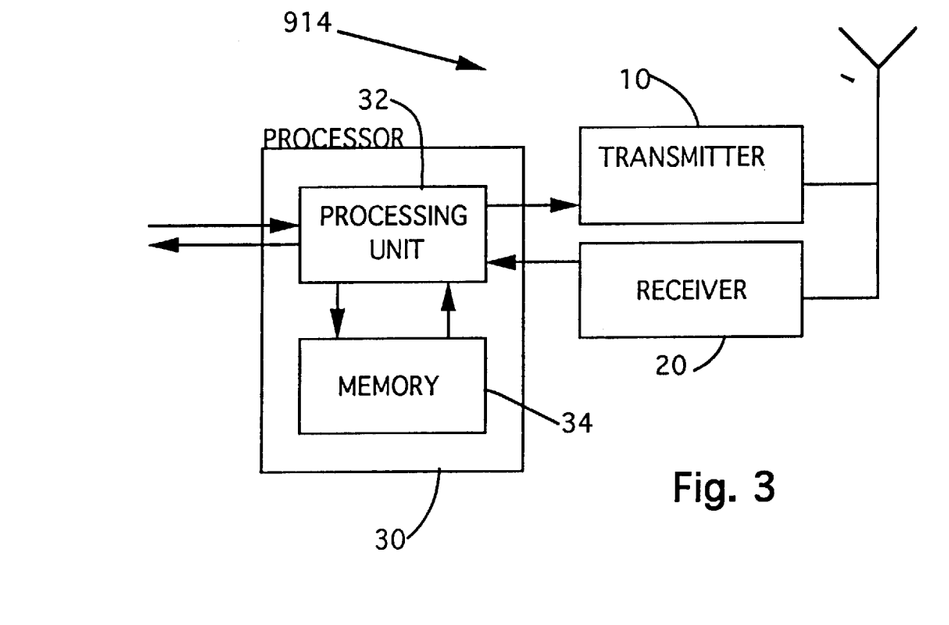
FIG. 3 is a block schematic diagram of a dual-mode transceiver of the system of FIG. 2.

Each DMBS 910 further comprises a plurality of dual mode radio transceivers (DMTS) 914. FIG. 3 is a block schematic diagram showing a DMT 914 in more detail. The DMT 914 comprises a radio transmitter 10, and radio receiver 20, and a signal processor 30 comprising a processing unit 32 and a memory 34 for storing instructions to be executed by the processing unit and data required for execution of those instructions. The signal processor 30 receives voice and packet data signals from the MTX 920 and processes those signals for transmission by the radio transmitter 10. The signal processor 30 also receives voice and packet data signals from the radio receiver 20 and processes those signals for transmission to the MTX 920. The signal processor 30 receives control signals from the RM 922 to switch the signal processor 30 between a voice mode in which it provides signal processing appropriate for voice signals and a packet data mode in which it provides signal processing appropriate for packet data signals.

Consequently, the DMTs 914 are operable in a voice mode to exchange voice traffic with MVTs 300 in cells served by the DMBSs 910, and operable in a packet data mode to exchange packet data traffic with MESs 600 served by the DMBSs 910. The RMs 922 of the MTXs 920 operate as controllers for switching the DMTs 914 between the voice mode of operation and the packet data mode of operation as will be explained in greater detail below.

Each DMBS 910 further comprises a packet data transceiver (PDT) 916 which operates only in the packet data mode and is dedicated to exchanging packet data signals with MESs 600 served by the DBMSs 910.

The MTXs 920 perform MDIS functions for packet data transmissions and are connected to public or private packet data networks (for example PDN 700) so that MESs 600 served by the integrated system 900 can be connected to fixed end stations (for example FES 800) which are served by the PDNs 700.

The VTs 912, DMTs 914 and PDT 916 are connected to the RMs 922 of the MTXs 920 via one or more shared multiplexed transmission links.

The RM 922 of each MTX 920 maintains a VT queue and a DMT queue for each DMBS 910 served by the MTX 920. The VT queue contains identifiers of idle VTs 912. The DMT queue contains identifiers of DMTS 914 which are currently operating in packet data mode.

Figure 4:
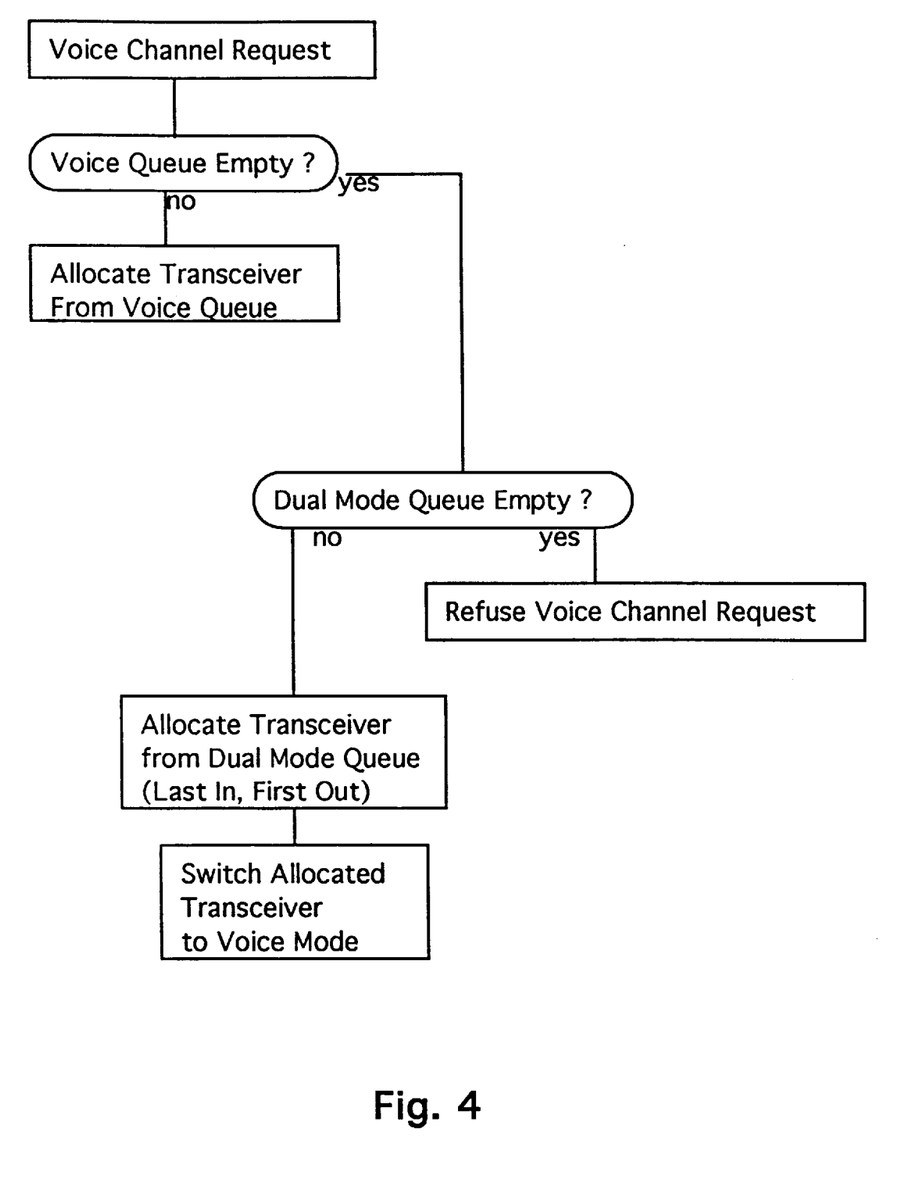
FIG. 4 is a flowchart illustrating a first part of a channel allocation algorithm used to allocate radio channels in the integrated system of FIG. 2

FIG. 4 is a flowchart illustrating a first part of a channel allocation algorithm used by the RMs 922 to allocate radio channels in the integrated system 900. When a request for a voice channel is received by the RM 922 (either because a MVT 300 is attempting to initiate a voice call or because another terminal is attempting to initiate a call to a MVT 300), the RM 922 first examines the voice queue to determine whether any VTs 912 are idle. If idle VTs 912 are found in the voice queue, the RM allocates an idle VT 912 to the voice call and updates the voice queue.

If the voice queue is empty, the RM 922 examines the dual mode queue to determine whether any DMTs 914 are operating in packet data mode. (The RM 922 automatically configures any DMTs 914 that are not allocated to a voice call in packet data mode for transmission of packet data on demand.) If DMTs 914 are found in the dual mode queue, the RM 922 allocates a DMT 914 from the dual mode queue on a last in, first out (LIFO) basis, and updates the dual mode queue.

If the voice queue and the dual mode queue are both empty, the RM 922 initiates refusal of the voice channel request.

The channel allocation algorithm described above ensures maximum use of all voice channels before packet data transmission are interrupted to provide voice communications. Moreover, as many of the DMTs 914 as possible are used for uninterrupted packet data transmissions. In addition, the PDT 916 is always used for uninterrupted packet data communications.

Figure 5A:
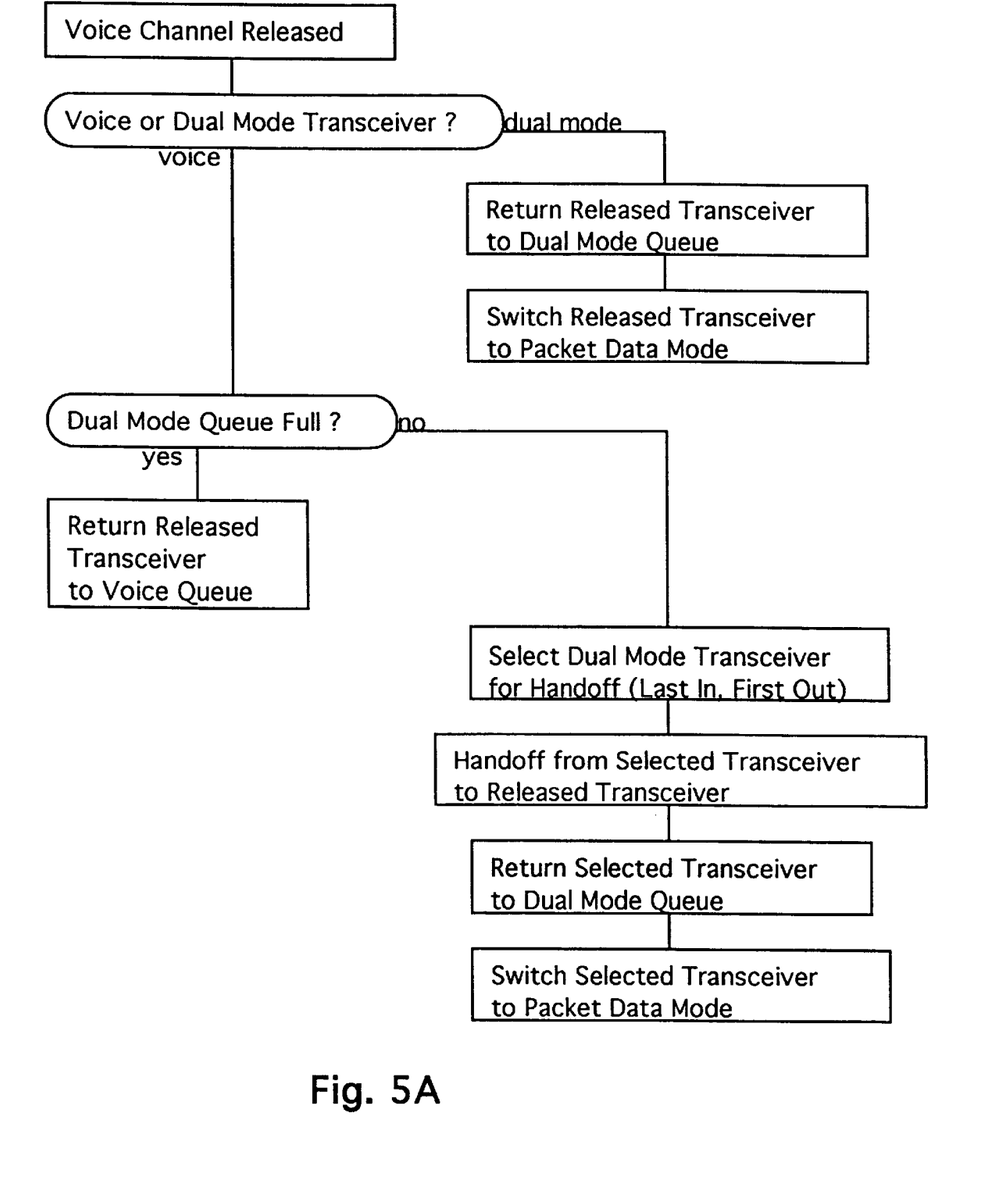
FIG. 5A is a flowchart illustrating a second part of the channel allocation algorithm in a full dual mode queue hand off configuration.

FIG. 5A is a flowchart illustrating a second part of the channel allocation algorithm when the RM 922 is configured in a full dual mode queue hand off configuration. Voice channels are released when a voice call served by a DMBS 910 is handed off to another DMBS 910, when a MVT 300 disconnects or when a release order is received indicating that the network or another terminal has disconnected. When a voice channel is released, the RM 922 determines whether the released voice channel was provided by a VT 912 or a DMT 914. If the released voice channel was provided by a DMT 914, the DMT 914 is returned to the dual mode queue and switched to packet data mode.

If the released voice channel was provided by a VT 912, the transceiver which provided by the released voice channel is now available for use by any other voice call. In particular, the VT 912 which provided the released voice channel could now provide a voice channel for any voice call which is currently being handled by a DMT 914 operating in voice mode. This would enable the DMT 914 to switch to packet data mode to provide higher packet data throughput.

Consequently, if the released voice channel was provided by a VT 912, the RM 922 selects a DMT 914 which is currently operating in voice mode, hands off a voice call from the selected DMT 914 to the VT 912 which previously provided the released voice channel, and returns the selected DMT 914 to the dual mode queue, switching the selected DMT 914 to the packet data mode.

Advantageously, the RM 922 may select the DMT 914 which was last allocated from the dual mode queue for the voice call hand off. The RM 922 may maintain a DMT voice queue for this purpose, entering the DMTs 914 into the DMT voice queue when they are switched from the packet data mode to the voice mode. The RM 922 may then select DMTs 914 from this queue on a LIFO basis when VTs 912 able to provide voice channels become available.

The full dual mode hand off arrangement described above may result in a large number of voice call hand offs in heavy voice traffic and this may be deemed unacceptable for some applications. To increase packet data throughput while reducing voice call handoff activity, the steps of FIG. 5A may be replaced by the steps of FIG. 5B which implement a partial dual mode handoff strategy. According to the partial dual mode hand off-strategy, voice calls are handed off from DMTs 914 to released VTS 912 only when the dual mode queue is empty (i.e. when all DMTs 914 are operating in voice mode, so that none of the DMTs 914 are contributing to packet data throughput).

Figure 5B:
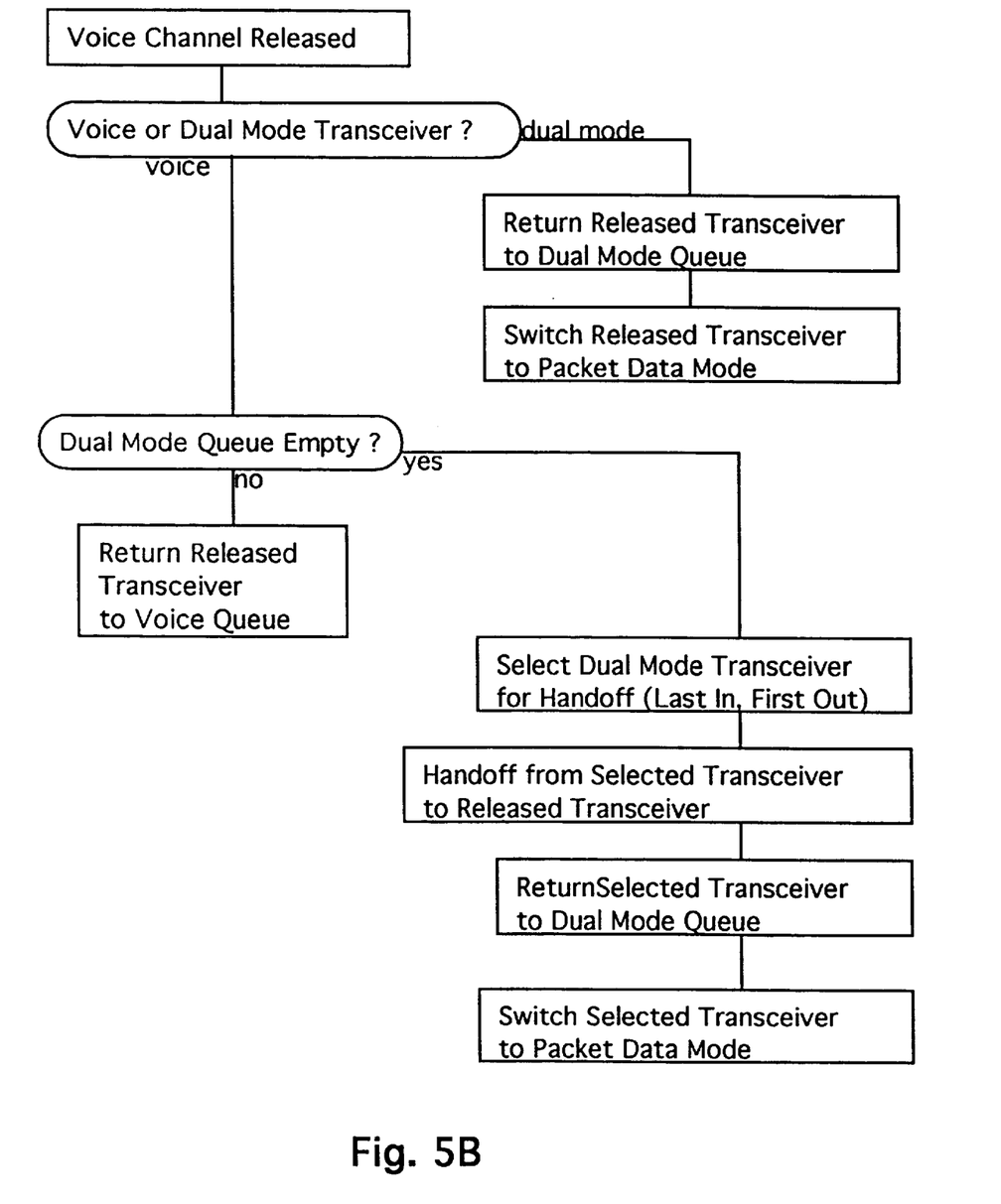
FIG. 5B is a flowchart illustrating a second part of the channel allocation algorithm in a partial dual mode queue hand off configuration.

Full dual mode handoff and partial dual mode hand off as described above may be implemented in the RM 922 as options which are configurable by the service provider who operates the integrated network 900. The hand off options may be automatically disabled when operational measurements indicate that the integrated system 900 is in a voice overload condition. The hand off options may also be disabled so long as at least one dedicated packet data channel (provided by the PDT 916) remains in service.

Figure 6:
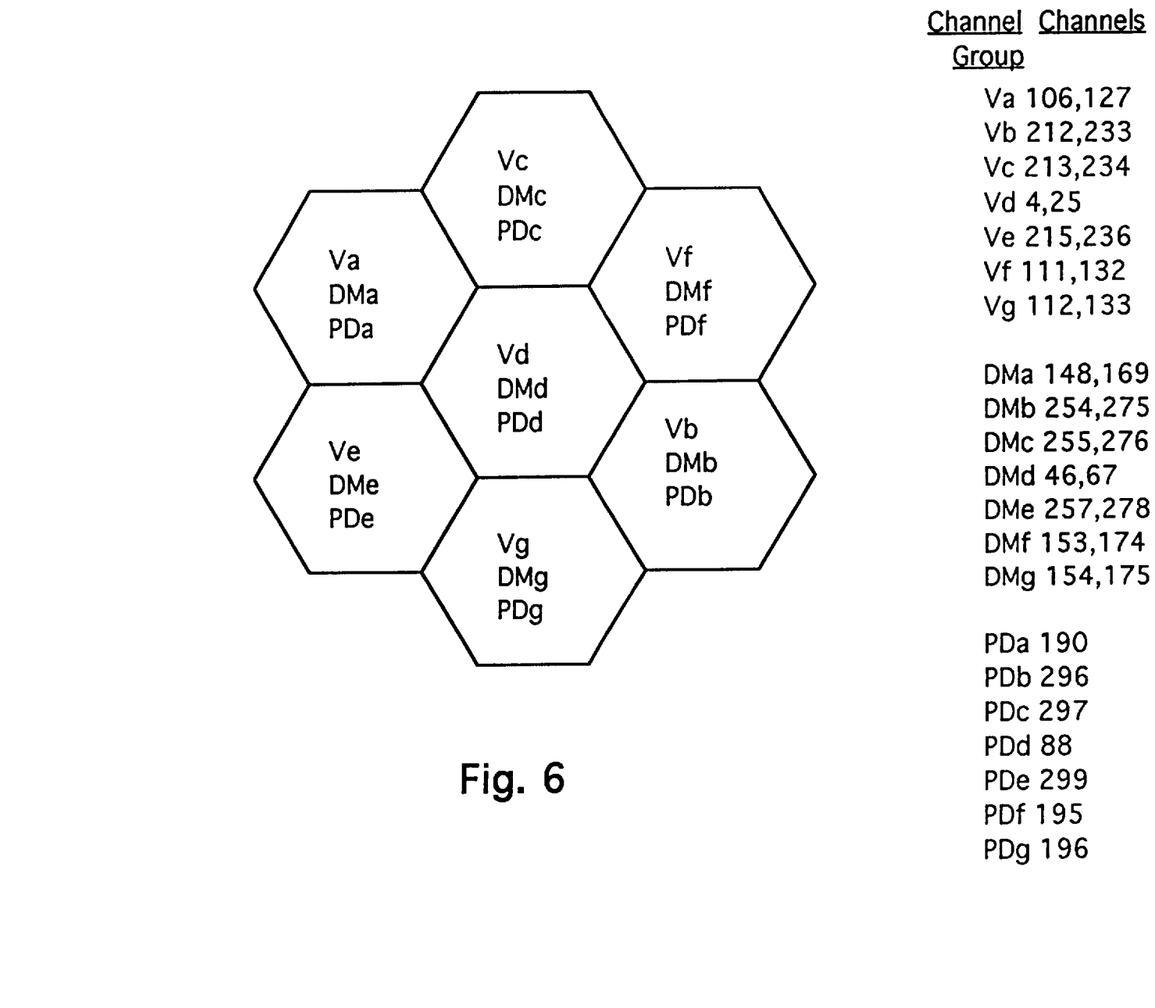
FIG. 6 illustrates dual mode, packet data and voice frequency plans for the integrated system of FIG. 2.

FIG. 6 illustrates distinct dual mode, packet data and voice frequency plans for the integrated system of FIG. 2. The frequency plans are based on seven groups of channels dedicated to voice communications (Va, Vb, Vc, Vd, Ve, Vf, and Vg), seven groups of channels dedicated to packet data communications (PDa, PDb, PDc, PDd, PDe, PDf and PDg), seven groups of channels that can be used for either voice or packet data communications (DMa, DMb, DMc, DMd, DMe, DMf and DMg), and assume two VTs 912, two DMTs 914 and one PDT 916 per cell. The use of distinct frequency plans for the dual mode channels, packet data channels and the voice channels reduces the interference between voice transmissions and packet data transmissions that can result from the different intercell hand off algorithms used for voice and packet data communications.

In the integrated system 900, the RM 922 and the DMTs 914 are shared between voice and packet data services, so that packet data services can be added to voice services for the relatively low incremental cost of the software required to provide the packet data services. Moreover, the use of a common RM 922 for voice and packet data services avoids the need to scan the voice channels to determine which voice channels are currently in use because that information is already available in the controller. This avoids the cost of radio frequency scanners 214 of the CDPD network 200 and the processing resources needed to drive the radio frequency scanners 214. In addition, the common RM 922 assigns channels to voice and packet data traffic in a more orderly manner to reduce the number of channel hops needed for packet data traffic. This increases the packet data throughput without increasing voice call blocking.

Alternatively, because the number of channel hops is reduced, the duration of the switching operations performed at each channel hop has a smaller impact on the data throughput. Consequently, the design constraints on this switching duration may be relaxed, reducing the cost of the hardware and software implementation.

The embodiments described above may be modified without departing from the principles of the invention, the scope of which is defined by the claims below.

For example, the integrated system 900 could have more or fewer DMBSs 910 or more or fewer MTXs 920 than illustrated. Some or all of the MTXs 920 could serve multiple DMBSs 910.

Each DMBS 910 could have a different number of the various transceiver types. For example, some or all of the DMBSs 910 could have no VTs 912 so long as enough DMTs 914 are provided to meet the demands of the voice traffic.

The VTS 912 may be DMTS 914 that are operator configured to operate only in voice mode. Similarly, the PDTs 918 may be DMTS 914 that are operator configured to operate only in packet data mode.

The VTS 912 could be AMPS, TDMA or dual mode AMPS/TDMA transceivers and the DMTS 914 could be operate in AMPS mode or TDMA mode when in voice mode. The DMTs 914 could even be "triple mode transceivers" selectively operable in AMPs mode, TDMA mode and packet data mode. If transceivers selectively operable in both AMPS and TDMA voice modes are used, the channel allocation algorithms described above will need to be extended accordingly.

Where the demand for mobile packet data services is relatively light, no PDTs 916 may be provided, all packet data services being provided by the DMTs 914. In this case, the partial or full dual mode hand off procedures are particularly advantageous as means for increasing packet data throughput.

The invention could also be implemented on a network architecture having separate voice transceivers 112 and packet data transceivers 212 that can operate on the same radio frequency channels as illustrated in FIG. 1, provided that the radio frequency channels that can be used for both voice and packet data communications are allocated from a common queue. This could be implemented, for example, by connecting the VTs 112 and PDTs 212 in FIG. 1 to a common controller which manages the queue.

In the embodiment described above, a separate processor 30 is provided for each DMT 914. Alternatively, a processor 30 could be shared by multiple DMTS 914, or separate processing units 32 could be provided for each DMT 914 while a single memory 34 could be shared by multiple processors 32.

The embodiment described in detail above is particularly suited to applications in which voice traffic is given priority over packet data traffic. Some applications may place other relative priorities on voice traffic and packet data traffic, and the control algorithm may be modified to suit the modified priorities. Similarly, some applications may favour queue management schemes other than LIFO, for example FIFO or activity-based queuing schemes.

These and other modifications of the embodiment described in detail above are within the scope of the invention as defined by the claims below.

We claim:

1. An integrated voice and data packet telecommunications system having a plurality of dual mode channels, the system comprising:

a plurality of transceivers, at least some of the transceivers being operable to transmit and receive voice traffic on at least one of the dual mode channels, and at least some of the transceivers being operable to transmit and receive packet data traffic on at least one of the dual mode channels; and a controller for controlling the plurality of transceivers so as to allocate the dual mode channels to voice communications and packet data communications, the controller being operable (i) to maintain a dual mode queue of dual mode channels not allocated to voice communications, (ii) to select a dual mode channel according to its position in the dual mode queue in response to a demand for a voice channel, and (iii) to allocate to packet data communications any dual mode channel not selected for allocation to voice communications.

2. A system as defined in claim 1, wherein the controller is operable in response to release of a dual mode channel allocated to voice communications to return the dual mode channel to the dual mode queue and to reallocate the dual mode channel to packet data communications.

3. A system as defined in claim 2, wherein the controller operates the dual mode queue as a Last In, First Out (LIFO) queue.

4. A system as defined in claim 2, wherein:

the system has a plurality of voice channels in addition to the plurality of dual mode channels, the voice channels being dedicated to voice communications;

the controller is operable to maintain a voice queue of idle voice channels;

the controller is operable, in response to a request for a voice channel when at least one voice channel is present in the voice queue, to select a channel from the voice queue; and the controller is operable, in response to a request for a voice channel when no voice channel is present in the voice queue, to demand a channel from the dual mode queue.

5. A system as defined in claim 4, wherein the controller is operable in response to release of a voice channel when the dual mode queue is empty (i) to select a dual mode channel, (ii) to hand off a voice call served by the selected dual mode channel to the released voice channel, (iii) to return the selected dual mode channel to the dual mode queue, and (iv) to reallocate the selected dual mode channel to packet data communications.

6. A system as defined in claim 4, wherein the controller is operable in response to release of a voice channel when at least one dual mode channel is allocated to voice communications (i) to select a dual mode channel which is allocated to voice communications, (ii) to hand off a voice call served by the selected dual mode channel to the released voice channel, (iii) to return the selected dual mode channel to the dual mode queue, and (iv) to reallocate the selected dual mode channel to packet data communications.

7. A system as defined in claim 4, wherein:

the controller is configurable in a first hand off mode in which the controller responds to release of a voice channel when the dual mode queue is empty by selecting a dual mode channel, handing off a voice call served by the selected dual mode channel to the released voice channel, returning the selected dual mode channel to the dual mode queue, and reallocating the selected dual mode channel to packet data communications; and the controller is configurable in a second hand off mode in which the controller responds to release of a voice channel when at least one dual mode channel is allocated to voice communications by selecting a dual mode channel which is allocated to voice communications, handing off a voice call served by the selected dual mode channel to the released voice channel, returning the selected dual mode channel to the dual mode queue, and reallocating the selected dual mode channel to packet data communications.

8. A system as defined in claim 4, having a plurality of cells, a respective subset of the plurality of voice channels being assigned to each cell and a respective subset of the plurality of dual mode channels being assigned to each cell.

9. A system as defined in claim 2, having at least one packet data channel in addition to the plurality of dual mode channels, the packet data channel being dedicated to packet data communications.

10. A system as defined in claim 9, having at least one packet data channel in addition to the plurality of dual mode channels, the packet data channel being dedicated to packet data communications, wherein the controller is configurable such that the first and second handoff modes are disabled with the at least one packet data channel is in operation.

11. A system as defined in claim 1, wherein:
   at least one transceiver of the plurality of transceivers is a dual mode transceiver which is operable in a voice mode to transmit and receive voice traffic and operable in a packet data mode to transmit and receive packet data traffic; and
   the controller is operable to switch the dual mode transceiver between the voice mode of operation and the packet data mode of operation.

12. A method of operating an integrated voice and data telecommunications system, the system having a plurality of dual mode channels each operable in a voice mode for voice communications and in a packet data mode for packet data communications, the method comprising:
   maintaining a dual mode queue of dual mode channels allocated to packet data communications;
   selecting, in response to a demand for a voice channel, a dual mode channel according to its position in the dual mode queue; and
   allocating the selected channel to voice communications.

13. A method as defined in claim 12, further comprising, in response to release of the demanded voice channel, returning the dual mode channel to the dual mode queue and reallocating the dual mode channel to packet data communications.

14. A method as defined in claim 13, comprising operating the dual mode queue as a Last In, First Out (LIFO) queue.

15. A method as defined in claim 12, wherein the system has a plurality of voice channels in addition to plurality of dual mode channels, the voice channels being dedicated to voice communications, the method further comprising:
   maintaining a voice queue of idle voice channels;
   in response to a request for a voice channel when at least one voice channel is present in the voice queue, selecting a channel from the voice queue;
   in response to a request for a voice channel when no voice channel is present in the voice queue, demanding a channel from the dual mode queue.

16. A method as defined in claim 15, further comprising, in response to the dual mode queue being empty and a voice channel being released:
   selecting a dual mode channel;
   handing off a voice call served by the selected dual mode channel to the released voice channel;
   returning the selected dual mode channel to the dual mode queue; and
   reallocating the selected dual mode channel to packet data communications.

17. A method as defined in claim 15, further comprising, in response to at least one dual mode channel being allocated to voice communications and a voice channel being released:
   selecting a dual mode channel;
   handing off a voice call served by the selected dual mode channel to the released voice channel;
   returning the selected dual mode channel to the dual mode queue; and
   reallocating the selected deal mode channel to packet data communications.

18. A method as defined in claim 12, wherein the system comprises radio transceivers for voice communications and radio transceivers for packet data communications located at a common base station site, the method further comprising multiplexing voice traffic with packet data traffic for transmission to and from the common base station site on a shared multiplexed transmission link.

* * * * *